(12) United States Patent
Ito et al.

(10) Patent No.: US 6,464,264 B1
(45) Date of Patent: Oct. 15, 2002

(54) HEAT RESISTING RESIN BASED ENGAGING AND HOLDING MEMBER

(75) Inventors: Tomohide Ito, Kasugai (JP); Akira Takayanagi, Aichi-ken (JP); Hiroaki Ito, Kasugai (JP); Kazutaka Katayama, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 52 days.

(21) Appl. No.: 09/667,565

(22) Filed: Sep. 22, 2000

(30) Foreign Application Priority Data

Sep. 24, 1999 (JP) ............................................ 11-270718

(51) Int. Cl.⁷ .................................................. F16L 35/00
(52) U.S. Cl. ........................................ 285/319; 285/921
(58) Field of Search .................................... 285/319, 921

(56) References Cited

U.S. PATENT DOCUMENTS

| | | | |
|---|---|---|---|
| 3,626,026 A | * 12/1971 | Fukumura | ................... 260/857 |
| 5,161,833 A | 11/1992 | McNaughton et al. | |
| 5,286,809 A | * 2/1994 | Heinz et al. | ................. 525/420 |
| 5,374,088 A | 12/1994 | Moretti et al. | |
| 5,607,190 A | * 3/1997 | Exandier et al. | ............. 285/319 |
| 5,716,684 A | * 2/1998 | Stoeppelmann et al. | . 428/36.91 |
| 5,756,580 A | * 5/1998 | Natori et al. | ................ 525/100 |
| 5,785,358 A | * 7/1998 | Kujawski et al. | ........ 285/319 X |
| 6,140,459 A | * 10/2000 | Lefoeuf et al. | ............. 528/310 |

FOREIGN PATENT DOCUMENTS

JP   2000337481   * 12/2000

* cited by examiner

*Primary Examiner*—Lynne H. Browne
*Assistant Examiner*—David E. Bochna
(74) *Attorney, Agent, or Firm*—Oblon, Spivak, McClelland, Maier & Neustadt, P.C.

(57) ABSTRACT

A heat resistance resin based engaging and holding member 4 for a connector is stopped at a female member 2 of a connector, and is engaged with a male member 1 housed at one end of the female member 2 to connect the male member 1 to the female member 2. This engaging and holding member consists of a heat resistance resin having 10% or more in elongation; 4000 MPa or less in Young's modulus in flexure; 80° C. or more in glass transition temperature; and 100° C. or more in heat distortion temperature under a load of 1.85 MPa.

6 Claims, 1 Drawing Sheet

HEAT RESISTING RESIN BASED ENGAGING AND HOLDING MEMBER

BACKGROUND OF THE INVENTION

The present invention relates to an engaging and holding member employed for a connector for interconnecting hoses or pipes and the like that supply fluid that is gasoline, oil, water and air or the like. In particular, the present invention relates to a resin based engaging and holding member suitable to use under high temperature environment.

Conventionally, a variety of connectors is used for interconnecting various hoses or pipes and the like of a vehicle. Such connector is generally made of a synthetic resin and comprises a cylindrical female member that houses a pipe shaped mail member at one end and includes a hose attachment portion at the other end. An engaging and holding member (retainer) stopped at this female member is engaged with a recess or protrusion of the male member housed in the female member, whereby the mail member is connected to the female member.

One of the typical connectors include a quick connector disclosed in U.S. Pat. No. 09-189406 (refer to FIG. 1). This quick connector comprises: a cylindrical female member 2 that houses a male member 1 such as metal pipe at one end and includes a hose attachment portion 3 for attaching a resin hose or the like at the other end; and an engaging and holding member 4 engagingly fitted into the female member 2. This engaging and holding member 4 is inserted from an opening at one end of the female member 2, and is fitted with the female member 2. Further, the member 4 is engaged with an annular protrusion 5 of the male member 1 so as to connect the male member 1 to the female member 2. A sealing member 6 such as O ring for sealing between the outer circumference faces of the male member 1 and an annular bush 7a or collar 7b for holding the sealing member 6 at a predetermined position are disposed on the inner circumstance face at the center of the female member 2.

The engaging and holding member 4 used for a quick connector of such type is a substantial cylindrical shape that is formed so as to be gradually reduced in diameter from one end to the other end, for example, and at least one portion is cut in an axial direction, thereby making it possible to elastically deform the member. Therefore, such engaging and holding member 4 that can be elastically deformed is inserted while the member is gradually reduced in diameter into the female member 2. Then, a pair of engaging protrusions 4a, 4a provided at its outer circumference face can be snap fitted to window portions 2a, 2a or recess provided at the female member 2. The engaging and holding member 4 thus snap fitted to the female member 2 is engaged with the annular protrusion 5 of the male member 1 at a short diameter end part 4b of the other end thereof, whereby the male member 1 can be connected to the female member 2 so as not to move in an axial direction. A pair of operating arm portions 8, 8 is provided integrally at one end of this engaging and holding member 4. These operating arm portions 8, 8 are entirely reduced in diameter by pushing them inwardly in a radial direction, whereby the engaging and holding member 4 can be removed from the female member 2 together with the male member 1.

Recently, the use in high temperature environment such as the inside of an engine room of a vehicle, specifically the use under high temperature of about 80 to 150° C. is discussed as the use of a variety of connectors including the above quick connector shown in FIG. 1.

However, a conventional connector is generally made of a resin. Thus, there has been a disadvantage that heat resistance is insufficient under a high temperature of 80 to 150° C. such as the inside of an engine room, and in particular, an engaging and holding member mutually engaged with a cylindrical female member and a male member is likely to be softened and deformed or damaged, and holding force is lowered rapidly. For example, as shown in FIG. 1, the engaging and holding member 4 having an engaging protrusion 4a engaged with the female member 2 and a short diameter end part 4b fitted to the male member 1 is made of a resin prone such as a copolymer of hexamethylene diamine and dodecane diacid (generally referred to as PA612) to be elastically deformed. Thus, the member 4 has been likely to be softened under a high temperature, and the engaging protrusion 4a or short diameter end part 4b has been likely to deformed or broken.

Although the entire connector is discussed to be made of metal, even if it is possible to provide a cylindrical female member of metal, there are a plenty of cases in which the engaging and holding member is complexly shaped in particular. There has been an inconvenience that the degree of design freedom is significantly limited for a manufacturing reason if the connector is made of metal. In addition, there has been a problem that surface processing such as plating applied to a pipe that is a male member is damaged by the engaging and holding member by employing a metallic engaging and holding member.

SUMMARY OF THE INVENTION

The present invention has been made in view of such conventional circumstances. It is an object of the present invention to provide a resin based engaging and holding member comprising a resin based engaging and holding member having high degree of design freedom, the member being easily elastically deformed and being free of damaging a counterpart member, the member being capable of holding sufficient pulling force even in high temperature environment of 80 to 150° C. such as the inside of an engine room of a vehicle, the member being usable in combination with a metal based and reinforced resin based female member.

In order to achieve the foregoing object, an engaging and holding member that the present invention provides is the engaging and holding member stopped at a female member of a connector and engaged with a male member housed at one end of the female member to connect the male member to the female member, the engaging and holding member consisting of a heat resistance resin having its elongation of 10% or more, Young's modulus in flexure 4000 MPa or less, glass transition temperature of 80° C. or more, and heat distortion temperature of 100° C. or more under a load of 1.85 MPa.

According to the present invention, the engaging and holding member is made of a heat resistance resin in which elongation ($E_B$), Young's modulus in flexure, glass transition temperature (Tg), and heat distortion temperature (HDT) are within a specific range, whereby an engaging and holding member likely to be elastically deformed and free of damaging a counterpart member can be provided. Further, by employing this engaging and holding member, there can be provided a heat resistance connector having its proper insertion force and sufficient pulling force under a high temperature and having its excellent reliability in high temperature environment of about 80 to 150° C. such as the inside of an engine room of a vehicle. Therefore, the engaging and holding member according to the present invention has the same flexibility as a conventional resin based engaging and holding member, can be easily inserted into a female member and a male member, holds sufficient heat resistance against a high temperature up to 150° C., and is compatible with its required sufficient pulling force.

If the elongation ($E_B$) of a resin configuring the engaging and holding member is less than 10%, when a male member being a counterpart member is inserted into an engaging and holding member stopped at a female member, the engaging and holding member is likely to crack. In addition, if the Young's modulus in flexure exceeds 4000 MPa, the insertion force required to insert the male member is increased in the same way as described above, thus making it difficult to easily insert and connect the male member such as pipe. On the other hand, if the resin glass transition temperature (Tg) is less than 80° C. or if the heat distortion temperature (HDT) under a load of 1.85 MPa is less than 100° C., the material strength under a high temperature is lowered. Thus, an engaging protrusion fitted to a female member or an engagement portion engaged with another member such as short diameter end part fitting a male member is likely to be deformed or damaged, and a satisfactory pulling force cannot be held.

Such heat resistance resin characterized by elongation ($E_B$) of 10% or more; Young's modulus in flexure of 4000 MPa or less; glass transition temperature (Tg) of 80° C. or more, and heat distortion temperature (HDT) of 100° C. or more under a load of 1.85 MPa can be selected from among a variety of known resins. Preferred examples can include, for example, copolymer of hexamethylene diamine and terephthalic acid (generaly referred to as PA6T); copolymer of nonanoic methylene diamine and terephthalic acid (generally referred to as PA9T); polyphenyl sulfide (generally referred to as PPS); copolymaer of hexamethylene diamine, adipic acid and terephftalic acid (generally referred to as PA6T/66); copolymer of hexamethylene diamine, isophthalic acid and terephthalic acid (generally, referred to as PA6T/6I); copolymer of hexaethylene diamine, adipic acid, isophtalic acid and terephthalic acid (generally referred to as PA6T/6I/66); copolymer of hexamethylene diamine, methyl pentane diamine and terephthalic acid generally referred to as PA6T/M-5T); copolymer of caprolactam, hexamethylene diamine and terephthalic acid (generally referred to as PA6T/6) or the like.

An engaging and holding member consisting of such heat resistance resin according to the present invention, of course, can be employed in combination with a resin based female member similar to a conventional member, and can also be used in combination with a metal based or reinforce resin based female member. In this case, the shapes or the like of the engaging and holding member and female member is not restricted, and a mechanism concerning fitting into the female member and engagement with the male member is not limited at all.

In addition, the above heat resistance resin has its excellent chemical resistance. Therefore, a connector comprising an engaging and holding member made of this heat resistance resin holds sufficient durability against anti-freezing agent or the like in comparison with a conventional resin based connector.

DETAILED DESCRIPTION OF PREFERRED EMBODIMENTS

Figure 1:
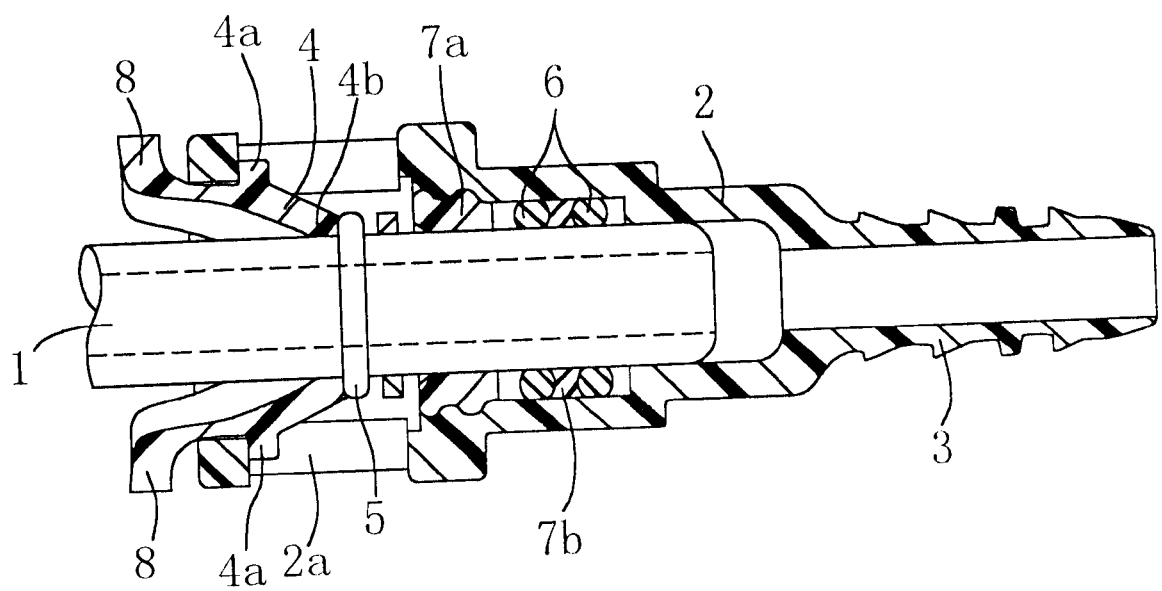
FIG. 1 is a schematic cross section showing a specific example of a connector.

As shown in FIG. 1, a connector comprises: a cylindrical female member 2 that houses a male member 1 at one end and includes a hose attachment portion 3 at the other end; and an engaging and holding member 4 snap fitted into window portions 2a, 2a of a female member 2 by a pair of engaging protrusions 4a, 4a. In this connector, the materials of the engaging and holding member were changed as shown in Table 1. The above female member 2 was made of PA12 reinforced by glass fiber. Samples marked with asterisks (*) shown Table 1 demote comparative examples.

In Table 1, PA6T denotes a copolymer of hexamethylene diamine and telephthalic acid; PA9A denotes a copolymer of nonanoic methylene diamine and telephthalic acid; PPS denotes a polyphenyl sulfide; and PA612 denotes a copolymer of hexamethylene diamine and dodecane diacid. In addition, characteristic values each were measured by a method in which elongation ($E_B$) is specified in accordance with ASTM D638; the Young's modulus in flexure is specified in accordance with ASTM D790; the glass transition temperature Tg is specified in accordance with ASTM D3418; and the heat distortion temperature HDT is specified in accordance with ASTM D648 (a load of 1.85 MPa).

With respect to a resin connector comprising each resin based engaging and holding member shown in Table 1, there was measured the insertion force caused when the male member 1 is inserted into the engaging and holding member 4 snap fitted into the female member 2 at a normal temperature (25° C.). In addition, there was measured the pulling force required to pull out the male member 1 engaged with this engaging and holding member 4 in an axial direction under high temperature environment of 120° C. and 150° C. These measurement results are shown in Table 2. Samples marked with asterisks (*) shown in Table 2 denote comparative examples. In addition, in order to evaluate durability against anti-freezing agent, the engaging and holding member of each sample was immersed in a 50 wt. % calcium chloride solution at 60° C. for 200 hours, and the occurrences of cracks were visually observed.

TABLE 2

| sample | engaging and holding member | insertion force (N) | pulling force (N) | | anti-freezing agent |
|---|---|---|---|---|---|
| | | | 120° C. | 150° C. | |
| 1 | PA6T | 30 | 686 | 539 | no crack |
| 2 | PA9T | 40 | 784 | 637 | no crack |
| 3 | PPS | 50 | 686 | 539 | no crack |
| 4* | PA612 | 30 | 490 | 372 | no crack |

As is evident from the result shown in Table 2, a resin connector comprising a heat resistance resin based engaging and holding member according to the present invention is substantially equal to a conventional resin connector in the insertion force and durability against anti-freezing agent, while an improvement of 40% or more is observed in pulling force at a high temperature, and the pulling force at 150° C. is far excellent in particular.

What is claimed is:

1. A heat resistance resin-based engaging and holding member stopped at a female member of a connector, and engaged with a male member housed at one end of the female member to connect the male member to the female member, said engaging and holding member comprising a heat resistance resin having 10% or more in elongation; 4000 MPa or less in Young' modulus in flexure; 80° C. or more in glass transition temperature; and 100° C. or more in heat distortion temperature under a load of 1.85 MPa, wherein said heat resistance resin is a copolymer of nonaneic methylene diamine and terephthalic acid.

2. A heat resistance resin-based engaging and holding member stopped at female member of a connector, and engaged with a male member housed at one end of the female member to connect the male member to the female member, said engaging and holding member comprising a heat resistance resin having 10% or more in elongation; 4000 MPa or less in Young's modulus in flexure; 80° C. or more in glass transition temperature; and 100° C. or more in heat distortion temperature under a load of 1.85 MPa, wherein said heat resistance resin is a copolymer of hexamethylene diamine, adipic acid, and terephthalic acid.

3. A heat resistance resin-based engaging and holding member stopped at a female member of a connector, and engaged with a male member housed at one end of the female member to connect the male member to the female member, said engaging and holding member comprising a heat resistance resin having 10% or more in elongation; 4000 MPa or less in Young's modulus in flexure; 80° C. or more in glass transition temperature; and 100° C. or more in heat distortion temperature under a load of 1.85 MPa, wherein said heat resistance resin is a copolymer of hexamethylene diamine, isophthalic acid, and terephthalic acid.

4. A heat resistance resin-based engaging and holding member stopped at a female member of a connector, and engaged with a male member housed at one end of the female member to connect the male member to the female member, said engaging and holding member comprising a heat resistance resin having 10% or more in elongation; 4000 MPa or less in Young's modulus in flexure; 80° C. or more in glass transition temperature; and 100° C. or more in heat distortion temperature under a load of 1.85 MPa, wherein said heat resistance resin is a copolymer of hexamethylene diamine, adipic acid, isophthalic acid, and terephthalic acid.

5. A heat resistance resin-based engaging and holding member stopped at a female member of a connector, and engaged with a male member housed at one end of the female member to connect the male member to the female member, said engaging and holding member comprising a heat resistance resin having 10% or more in elongation; 4000 MPa or less in Young's modulus in flexure; 80° C. or more in glass transition temperature; and 100° C. or more in heat distortion temperature under a load of 1.85 MPa, wherein said heat resistance resin is a copolymer of hexamethylene diamine, methyl pentane diamine, and terephthalic acid.

6. A heat resistance resin-based engaging and holding member stopped at a female member of a connector, and engaged with a male member housed at one end of the female member to connect the male member to the female member, said engaging and holding member comprising a heat resistance resin having 10% or more in elongation; 4000 MPa or less in Young's modulus in flexure; 80° C. or more in glass transition temperature; and 100° C. or more in heat distortion temperature under a load of 1.85 MPa, wherein said heat resistance resin is a copolymer of caprolactam, hexamethylene diamine, and terephthalic acid.

* * * * *